UNITED STATES PATENT OFFICE

JOHN L. JOHNSTON, OF SHERBROOKE, QUEBEC, CANADA.

IMPROVEMENT IN FLUID MEATS.

Specification forming part of Letters Patent No. 187,865, dated February 27, 1877; application filed October 14, 1876.

*To all whom it may concern:*

Be it known that I, JOHN LAWSON JOHNSTON, of the city of Sherbrooke, in the county of Sherbrooke, Province of Quebec, Dominion of Canada, have invented a new and useful Improvement in Fluid Meat, of which the following is a specification:

The object of this invention is to produce a fluid or paste combining the stimulating properties of the most approved extracts of meat and the nutritious qualities of flesh-food in a form easy of digestion and assimilation, and designed for use medicinally and as an article of food.

The invention consists in a fluid meat formed of the ingredients in the proportions and manner as hereinafter fully described.

To produce this fluid or paste, beef, mutton, chicken, or other flesh may be used by slightly modifying the manner of preparation.

I will describe the process as applied to beef. The parts of the animal which in life have least muscular action are selected and freed from all visible fat and tendon. The flesh is then minced to a pulp, and dried in an evaporating-jacket at a temperature commencing at about 200° Fahrenheit, and gradually decreased until all the moisture is expelled. It is then pulverized until a very fine smooth powder is produced, which constitutes the first ingredient of the preparation. The second ingredient is pure albumen, which I prefer to extract from the juice of the meat. This albumen is then dried in an evaporating-jacket, and pulverized in the manner hereinbefore described, with reference to the flesh. Either or both of these two ingredients may be treated with pepsin, if desired.

The third ingredient is an essence of beef, procured by any of the well-known processes, and of a consistency that may be varied to taste, and to which is added an eighth part of the purest gelatine obtained from bones or ox feet by any of the well-known processes.

The herein-described ingredients are then thoroughly mixed in the following proportions, which proportions may, however, be varied without departing from my invention: Three parts of the meat-powder, one part of the dried albumen, and six parts of the meat-essence and gelatine. The preparation is then packed in suitable vessels for preservation, and hermetically sealed.

These ingredients in different proportions may be used in the preparations of meat-lozenges, meat-biscuits, portable soups, or as a powder.

Having thus described my invention, I claim as new and desire to secure by Letters Patent—

A compound consisting of lean flesh and albumen, in the form of a dry powder, and the well-known gelatined meat-essence, as set forth.

JOHN L. JOHNSTON.

Witnesses:
FRANCIS BRAIDWOOD,
ISAAC W. SHARPE.